United States Patent
Wang et al.

(10) Patent No.: US 8,352,637 B2
(45) Date of Patent: Jan. 8, 2013

(54) TECHNIQUES FOR RESOLVING NETWORK CONNECTIVITY

(75) Inventors: Zhiqiang Wang, Ft. Collins, CO (US); Loren F. Wilson, Ft. Collins, CO (US); Srikanth Natarajan, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2948 days.

(21) Appl. No.: 10/667,313

(22) Filed: Sep. 23, 2003

(65) Prior Publication Data
US 2005/0076143 A1    Apr. 7, 2005

(51) Int. Cl.
G06F 15/16 (2006.01)
H04L 12/28 (2006.01)

(52) U.S. Cl. ............... 709/245; 709/227; 370/395.54

(58) Field of Classification Search .......... 709/224, 709/245, 227; 370/352, 395.54
See application file for complete search history.

(56) References Cited

U.S. PATENT DOCUMENTS

| 5,959,989 | A * | 9/1999 | Gleeson et al. | 370/390 |
| 6,026,442 | A * | 2/2000 | Lewis et al. | 709/229 |
| 6,269,076 | B1 * | 7/2001 | Shamir et al. | 370/217 |
| 2004/0078469 | A1 * | 4/2004 | Ishwar et al. | 709/227 |
| 2004/0133634 | A1 * | 7/2004 | Luke et al. | 709/203 |
| 2004/0213211 | A1 * | 10/2004 | Green | 370/352 |

OTHER PUBLICATIONS

Wikipedia Internet encyclopedia, http://en.wikipedia.org/wiki/MAC_address.*
Network Management Using HP OpenView Network Node Manager Extended Topology, HP-UX and Solaris, Manu. Part. No. J5307-90002, 2001, pp. 1-63.

* cited by examiner

*Primary Examiner* — Jeong S Park

(57) ABSTRACT

Techniques are described for resolving network connectivity. According to an exemplary embodiment, a determination is made whether a first device is included in a portion of a network in which the first device can receive information directed to all devices included within the portion of the network. A first identifier associated with the portion of the network is obtained. A second identifier is assigned to the portion of the network unique to other portions of the network. The first identifier associated with the portion of the network is modified to include the second identifier. The modified first identifier is associated with the first device and the portion of the network. A first symbol identifying the first device can be presented as being connected to a second symbol identifying the portion of the network using the modified first identifier.

29 Claims, 3 Drawing Sheets

TECHNIQUES FOR RESOLVING NETWORK CONNECTIVITY

BACKGROUND

A Local Area Network (LAN) can generally be defined as a broadcast domain. A broadcast domain includes a set of all devices operating in a portion of a network that will receive broadcast frames (frames directed to all devices in the set) originating from any device within the set. Certain types of network devices, including hubs, bridges, or switches, operating in the same physical LAN segment(s) of the network, can connect all end node devices within the segment(s). Consequently, end nodes can communicate with each other within the physical LAN segment(s) without the need for a router. Communication with devices on other LAN segments in the network requires the use of a router.

As networks expand, additional routers can be used to address bandwidth concerns, separate users into different broadcast (and collision) domains, and provide connectivity to other LANs in the network. Separating users into different broadcast domains can be useful, as broadcast requests can add a significant amount of traffic to the network that is "heard" by all nodes in the network. As this network grows, the broadcast traffic has the potential impact of flooding the network and making it essentially unusable.

Routers operate at the network level (Layer 3) of the Open System Interconnection (OSI) reference model. Routers use information included in a data packet, used to carry information, to determine destinations and route the information to the appropriate end node. The routing process can add latency that can delay the transmission of the information to the end node.

Bridges operate at the data link layer (Layer 2) of the OSI model, and typically add less latency than routers. Generally, a bridge can segment a LAN by filtering or forwarding an incoming frame based on a media access control (MAC) address of the frame. A bridged network operates as a single broadcast domain, resulting in any broadcast requests being sent to all ports within the bridged network. Consequently, bridges can be utilized to solve bandwidth problems but cannot be used to create separate broadcast domains.

Switches also operate at the data link layer (Layer 2) of the OSI model, and also typically add less latency than do routers. Generally, switches operate similar to bridges, but can be logically partitioned into separate broadcast domains called Virtual LANs, or VLANs. This logical partitioning can be used to limit the scope of broadcast requests to the individual VLANs themselves. VLANs can be viewed as a group of devices, perhaps on different physical LAN segments, that can communicate with each other as if they were all on the same physical LAN segment.

Using switches to logically partition a LAN segment into VLANs (having separate broadcast domains) not only adds less latency than adding a router to divide the LAN segment, but often provides a more cost-effective solution as well. In addition, VLANs can be used to group end users based on traffic patterns, irrespective of physical location, e.g., to optimize bandwidth utilization in the network or to address security concerns by limiting the scope of broadcast transmissions. Because each VLAN broadcast domain is considered a separate subnet, a single router is still required to exchange information between the VLANs. Typically, the router interface is a member of all of the VLANs between which it routes information.

When a switch is configured to logically partition a LAN segment into a VLAN, the VLAN is assigned an identifier, commonly referred to as a VLAN identifier. The assigned VLAN identifiers are not guaranteed to be unique across all broadcast domains. Accordingly, when VLAN information is collected for resolving network connectivity, the information cannot be readily used to distinguish among VLANs having the same VLAN identifier, but operating on separate broadcast domains. Consequently, all devices included in VLANs having the same VLAN identifier can be considered to be part of the same VLAN, even though all of the devices may not be logically partitioned into the same broadcast domain.

SUMMARY

Accordingly, techniques are disclosed for resolving network connectivity. According to an exemplary embodiment, a determination is made whether a first device is included in a portion of a network in which the first device can receive information directed to all devices included within the portion of the network. A first identifier associated with the portion of the network is obtained. A second identifier is assigned to the portion of the network unique to other portions of the network. The first identifier associated with the portion of the network is modified to include the second identifier. The modified first identifier is associated with the first device and the portion of the network.

According to another exemplary embodiment, a system is described for resolving network connectivity. The system includes memory and a processor. The processor includes logic configured to determine, using information stored in the memory, whether a first device is included in a portion of a network in which the first device can receive information directed to all devices included within the portion of the network. The processor also includes logic configured to obtain, from the memory, a first identifier associated with the portion of the network. Logic is included in the processor that is configured to assign a second identifier to the portion of the network unique to other portions of the network. The processor also includes logic configured to modify the first identifier associated with the portion of the network to include the second identifier. Additional logic included in the processor is configured to associate the modified first identifier with the first device and the portion of the network.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements, and.

DETAILED DESCRIPTION

Figure 1:
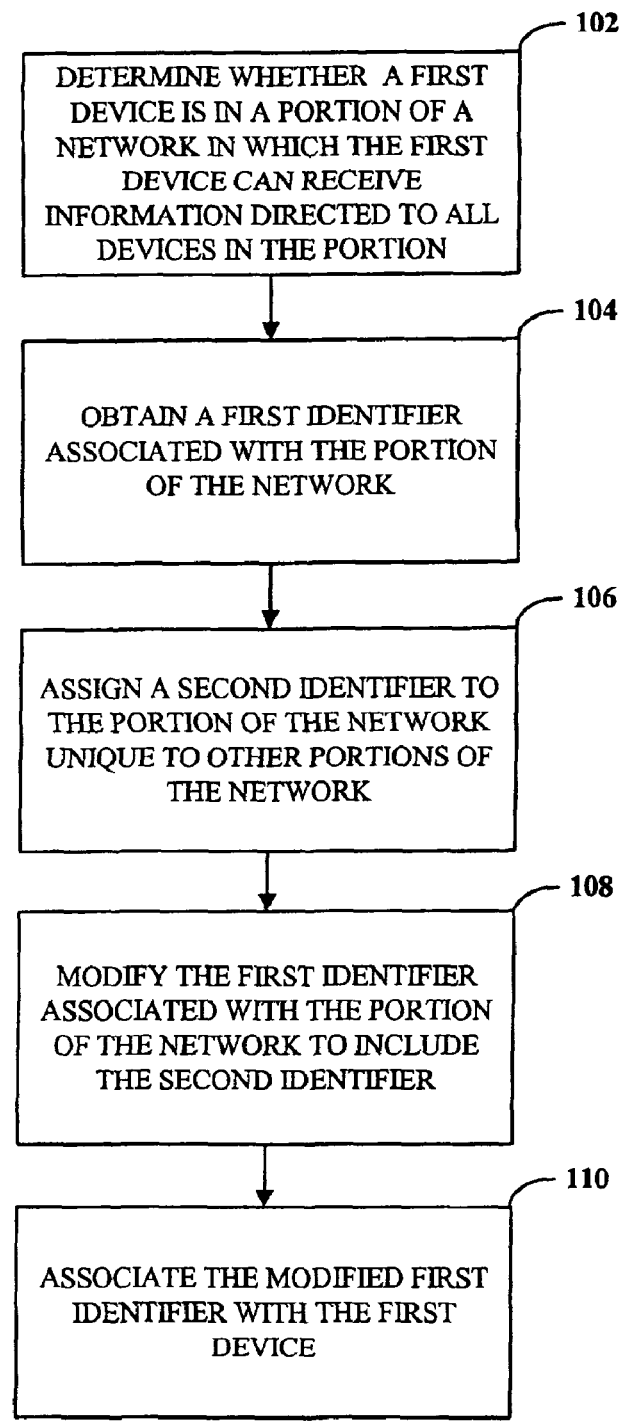
FIG. 1 is a flowchart illustrating a method for resolving network connectivity according to an exemplary embodiment.

FIG. 1 is a flowchart illustrating a method for resolving network connectivity. In block 102, a determination is made whether a first device is included in a portion of a network in which the first device can receive information directed to all devices included within the portion of the network. Generally, the portion of the network can be a broadcast domain and the information can be a broadcast message. According to an exemplary embodiment, the portion of the network can be a VLAN. Network topology discovery software, such as Hewlett Packard's (HP's) Open View Network Node Manager (NNM) Extended Topology Version 1.5, can be used to determine whether the first device is included in a portion of a network, such as a broadcast domain or VLAN.

Next, in block 104, a first identifier associated with the portion of the network is obtained. For example, according to an exemplary embodiment, the first device can be a network switch. The network switch can be configured to logically partition a LAN segment into a VLAN representing the portion of the network. The network switch can include a Management Information Base (MIB) configured to store an identifier of the VLAN, which can be the first identifier. In such an arrangement, the first identifier (or VLAN identifier) associated with the portion of the network (or VLAN) can be obtained using a Simple Network Management Protocol (SNMP) query to retrieve the VLAN identifier stored in the MIB.

According to yet another exemplary embodiment, the first device can be a port included in a network switch. In this arrangement, the network switch can be configured to logically partition a LAN segment connected to the port of the switch into a VLAN representing the portion of the network. The network switch can again include a MIB configured to store an identifier of the VLAN, which can be the first identifier. The first identifier (or VLAN identifier) associated with the portion of the network (or VLAN) can again be obtained using an SNMP query to retrieve the VLAN identifier associated with switch port stored in the MIB.

Next, in block 106, a second identifier is assigned to the portion of the network that is unique to other portions of the network. For example, in an arrangement where the portion of the network is a VLAN associated with a network switch and/or switch port, a second identifier, such as a domain identifier, can be assigned to the broadcast domain defined by the VLAN. The second identifier (or domain identifier) assigned to the VLAN is different than the domain identifiers assigned to other VLAN broadcast domains in the network arrangement. The second identifier (or domain identifier) is assigned to represent the portion of the network (or VLAN) in addition to the first identifier (or VLAN identifier) already associated with the network portion. The second identifier can be different than, or can be the same as the first identifier.

Next, in block 108, the first identifier associated with the portion of the network is modified to include the second identifier. For example, the second identifier can be appended to the first identifier to create a conjunctive identifier. The first identifier can be modified in any way to include the second identifier (e.g., through string manipulation, mathematical operation, etc.). As the second identifier is unique to other portions of the network, the modified first identifier will uniquely identify the portion of the network among other such portions of the network.

Finally, in block 110, the modified first identifier is associated with the first device and the portion of the network. The association can be stored, e.g., in a table in memory, or can occur dynamically, e.g., through the use of software.

Associating the modified first identifier with the first device and the portion of the network can be useful in a number of ways. For example, according to an exemplary embodiment, a first symbol, identifying the first device, can be presented connected to a second symbol, identifying the portion of the network, using the modified first identifier. Such a presentation can be used in conjunction with network management software, such as HP's NNM Extended Topology, to display a network topology map showing the association of the first device with the portion of the network.

Figure 3:
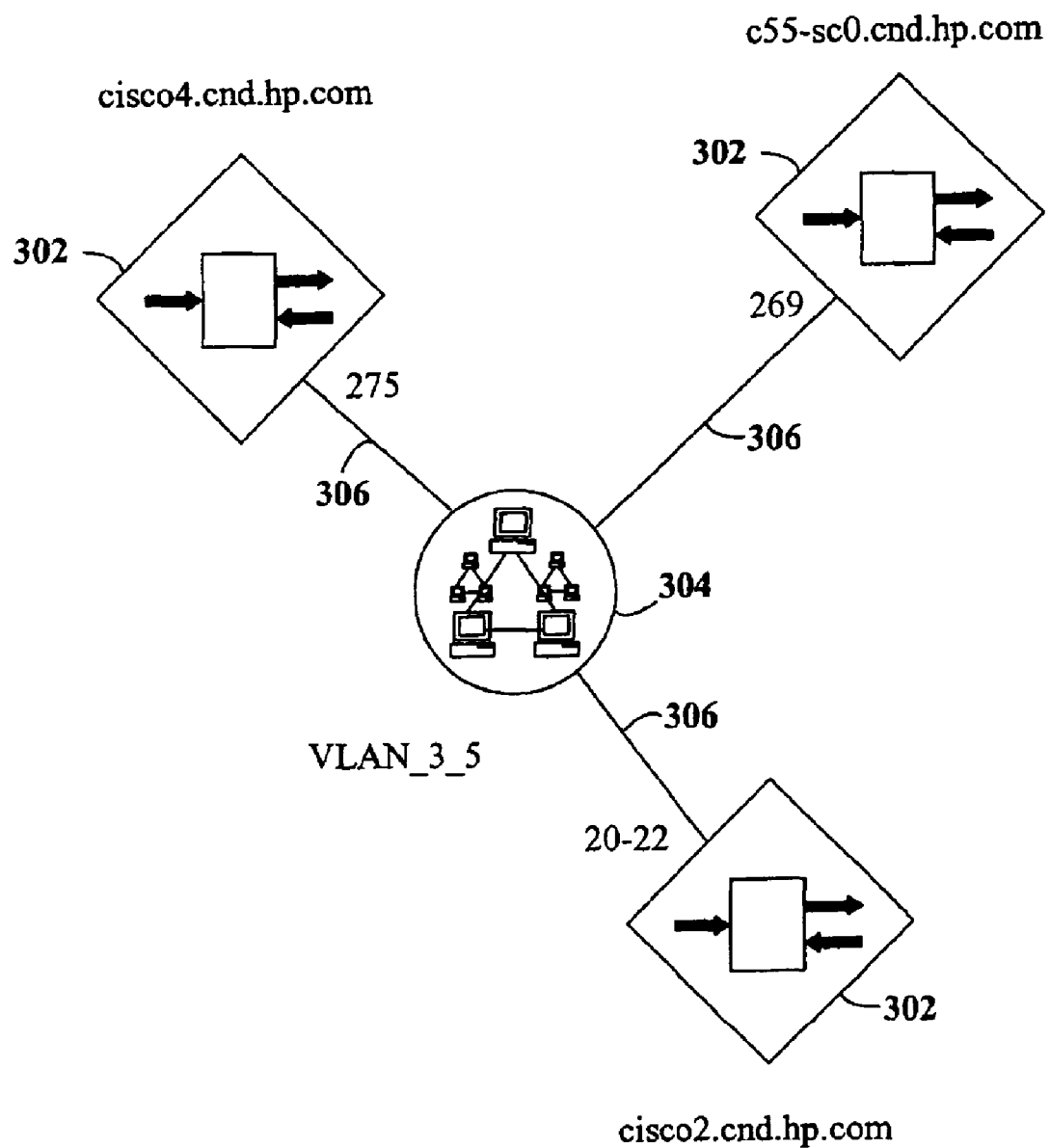
FIG. 3 illustrates a portion of a network topology map that can be generated using the techniques described for resolving network connectivity.

For example, FIG. 3 shows a presentation having a first symbol 302 representing a network switch (e.g., "c55-sc0.cnd.hp.com") as the first device, and a second symbol 304 representing a VLAN (e.g., "VLAN_3_5") as the portion of the network. The modified first identifier "VLAN_3_5" shown can be used in presenting a connection 306 between the network switch "c55-sc0.cnd.hp.com" and the VLAN "VLAN_3_5". The connection can represent the association between the switch and the VLAN.

The association between the first device and the portion of the network can also be presented in a tabular form as shown in Table 1. Proper VLAN connectivity for the three italicized switches ("cisco4.cnd.bp.com", "c55-sc0.end.hp.com", and "cisco2.cnd.hp.com") shown in FIG. 3 can be presented using a modified first identifier (VLAN_3_5) that includes the VLAN identifier (VLAN ID 3) of the switches, and a unique broadcast domain identifier (Domain ID 5) associated with the switches. Port identifiers can be included in the table, as shown, to indicate the ports of a switch participating in a particular VLAN broadcast domain.

TABLE 1

Table showing correct VLAN connectivity using VLAN and domain identifiers

| VLAN Name (Modified First Identifier) | VLAN ID | Domain ID | Switch Names | Ports |
|---|---|---|---|---|
| VLAN_3_1 | 3 | 1 | cat300-1.cnd.hp.com | 7-14 |
| VLAN_3_5 | 3 | 5 | cisco4.cnd.hp.com | 275 |
|  |  |  | c55-sc0.cnd.hp.com | 269 |
|  |  |  | cisco2.cnd.hp.com | 20-22 |
| VLAN_3_6 | 3 | 6 | cisco0.cnd.hp.com | 53-76 |
| VLAN_2_5 | 2 | 5 | cisco4.cnd.hp.com | 274 |
|  |  |  | cisco3.cnd.hp.com | 7-8 |
|  |  |  | cisco2.cnd.hp.com | 17-19 |
|  |  |  | c55-sc0.cnd.hp.com | 267-268 |
| VLAN_2_6 | 2 | 6 | cisco1.cnd.hp.com | 5-10 |
| VLAN_10_5 | 10 | 5 | cisco3.cnd.hp.com | 3-6 |
|  |  |  | cisco4.cnd.hp.com | 3-4 |
|  |  |  | c55-sc0.cnd.hp.com | 275-281 |
|  |  |  | cisco0.cnd.hp.com | 3-16 |
| VLAN_100_5 | 100 | 5 | cisco4.cnd.hp.com | 279-281 |
|  |  |  | c55-sc0.cnd.hp.com | 282-286 |
|  |  |  | cisco3.cnd.hp.com | 14-16 |
|  |  |  | cisco0.cnd.hp.com | 17-28 |

According to another exemplary embodiment, a second device included in the portion of the network can be identified, and the modified first identifier can then be associated with the second device as well. For example, FIG. 3 shows a second network switch "cisco4.cnd.hp.com" connected to the VLAN "VLAN_3_5", representing an association between the second switch and the VLAN. The association can also be presented in a tabular format as shown in Table 1.

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described. For each of the various aspects, any such form of embodiment can be referred to herein as "logic configured to" perform, or "logic that" performs a described action.

Figure 2:
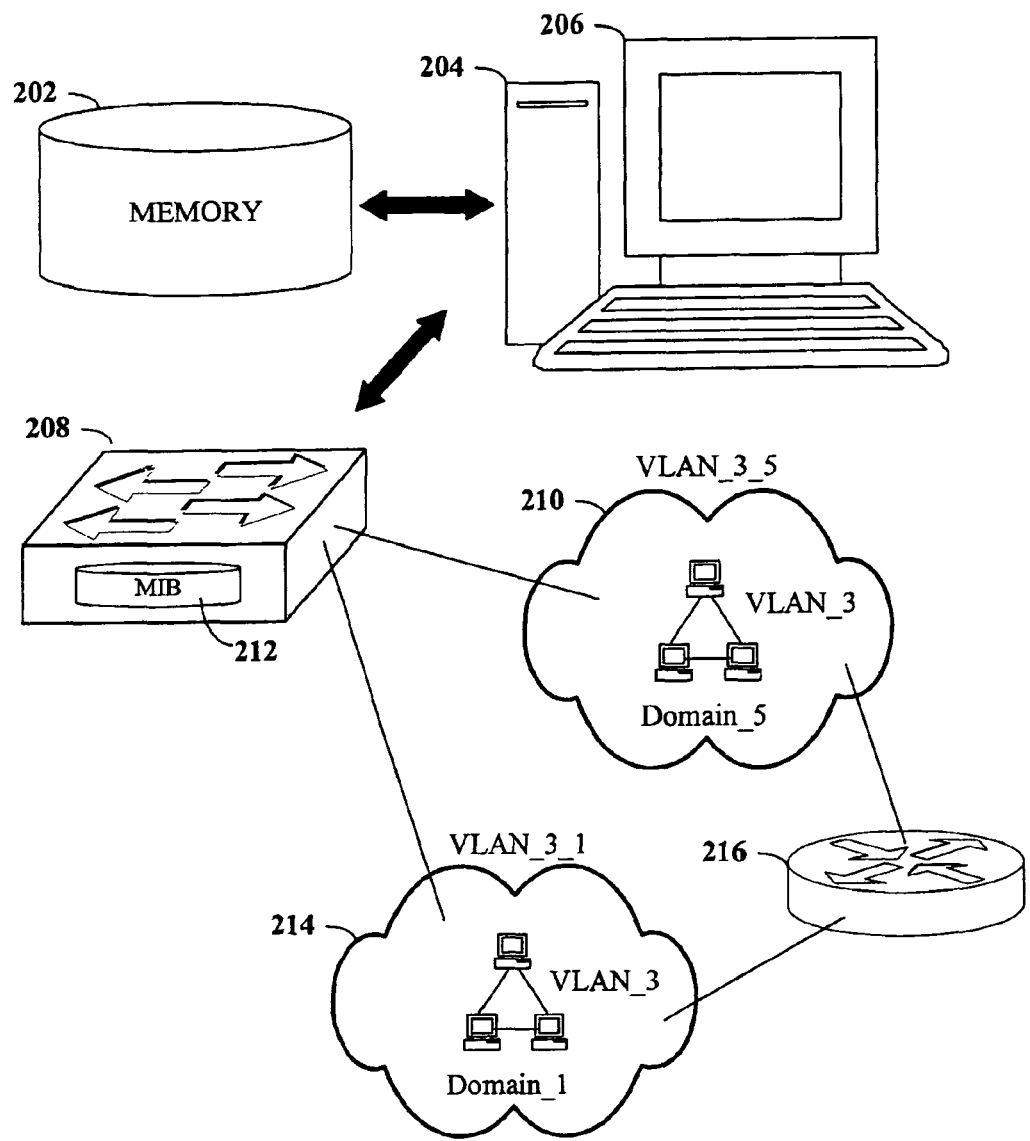
FIG. 2 illustrates a system for resolving network connectivity according to another exemplary embodiment.

A system for resolving network connectivity according to an exemplary embodiment is shown in FIG. 2. The system includes means for resolving network connectivity, such as memory 202 and a processor 204. The system includes means, such as logic, configured to determine, using information stored in the memory 202, whether a first device is included in a portion of a network in which the first device can receive information directed to all devices included within the portion of the network. As described in conjunction with the method shown in FIG. 1, the portion of the network can generally be a broadcast domain, and more specifically can be a broadcast domain defined by a VLAN. The information can be a broadcast message directed to all devices within the VLAN. The processor 204 can execute network topology discovery software, such as HP's NNM Extended Topology, to determine whether the first device is included in a portion of a network.

The processor 204 also includes logic configured to obtain, from the memory 202, a first identifier associated with the portion of the network. For example, the first device can be a network switch 208 configured to logically partition a LAN segment connected to the switch (or a switch port) into a VLAN 210 representing the portion of the network. The network switch can include means, such as a MIB 212, configured to store an identifier of the VLAN (e.g., VLAN_3), which can be the first identifier. The identifier (or VLAN_3) associated with the portion of the network (or VLAN 210) can be obtained using an SNMP query to retrieve the VLAN identifier associated with switch 208 or switch port stored in the MIB 212. Although shown separately in the figure, the MIB 212 can be a portion of the memory 202.

The system processor 204 also includes means, such as logic, configured to assign a second identifier to the portion of the network unique to other portions of the network. For example, in an arrangement where the portion of the network is the VLAN 210 associated with the network switch 208 and/or a switch port, a second identifier, such as a domain identifier (e.g., Domain_5), can be assigned to the broadcast domain defined by the VLAN 210. The second identifier (or domain identifier Domain_5) assigned to the VLAN 210 is different than other domain identifiers (e.g., Domain_1) assigned to other VLAN broadcast domains 214 in the network arrangement. The second identifier (Domain_5) is assigned to represent the portion of the network (VLAN 210) in addition to the first identifier (VLAN_3) already associated with the network portion. The second identifier can be different than (e.g., "5" versus "3"), or can be the same as the first identifier.

The processor 204 also includes logic configured to modify the first identifier associated with the portion of the network to include the second identifier. For example, the second identifier can be appended to the first identifier to create a conjunctive identifier, such as the identifier VLAN_3_5 associated with VLAN 210 in FIG. 2. The first identifier can be modified in any way to include the second identifier (e.g., through string manipulation, mathematical operation, etc.). As the second identifier is unique to other portions of the network, the modified first identifier will uniquely identify the portion of the network among other such portions of the network, e.g., VLAN 214.

The system processor 204 also includes means, such as logic, configured to associate the modified first identifier with the first device and the portion of the network. The association can be stored, e.g., in a table in the memory 202, or can occur dynamically, e.g., through the use of software. For example, a table, such as that shown in Table 1, can be used to associate a modified first identifier with the first device and the portion of the network. In the second row of Table 1, a modified first identifier (VLAN_3_5) is shown to be associated with a portion of the network (VLAN_3 in Domain 5) and a first device ("c55-sc0.cnd.hp.com").

Alternatively, "stitcher" programs included in network management software can be modified to associate the modified first identifier with the first device and the portion of the network. These programs "stitch together" network connectivity information to generate a network topology map, such as the map shown in FIG. 3. The following exemplary pseudo-code describes the modifications/additions that can be made to existing stitcher programs to associate the modified first identifier with the first device and the portion of the network.

```
main( ) {
//    Note: If two switches connect to each other directly, or through other
//    switches indirectly, they are considered to be neighbors in a same
//    broadcast domain.
      switchSet = CreateSetOfAllSwitches( );
      while switchSet < > empty {
            switch = SelectOneFromSet(switchSet);
            domainId = GetUniqueDomainId( );
            AssignDomainIdToSwitch(domainId, switch);
            RemoveSwitchFromSet(switch, switchSet);
            neighbors = FindAllNeighborsOfSwitchInSet(switch,
            switchSet);
            AssignDomainIdToSwitch(domainId, neighbors)
            RemoveSwitchFromSet(neighbors, switchSet);
      }
//    Note: VLAN objects in topology database have vlanId identifier.
      For each VLAN object in topology database {
            Modify OBJECT_VLAN_{vlanId} ->
            OBJECT_VLAN_{vlanId}_{domainId}
      }
}
```

According to an exemplary embodiment, the system can include means, such as a display 206, operatively coupled to logic included in the processor 204 configured to present on the display 206 a first symbol identifying the first device, connected to a second symbol identifying the portion of the network using the modified first identifier. The display 206 can be a network management console, or the display 206 and processor 204 can be embodied in a network management station used to monitor and manage the network.

For example, FIG. 3 shows a portion of a network topology map that can be presented on the display 206, having a first symbol 302 representing a network switch (e.g., "c55-sc0.cnd.hp.com") as the first device, and a second symbol 304 representing a VLAN (e.g., "VLAN_3_5") as the portion of the network. The modified first identifier "VLAN_3_5" shown can be used in presenting a connection 306 between the network switch "c55-sc0.cnd.hp.com" and the VLAN "VLAN_3_5". The connection can represent the association between the switch and the VLAN.

The processor 204 can also include logic configured to identify, using information stored in the memory 202, a second device included in the portion of the network. Logic configured to associate the modified first identifier with the second device can also be included in the processor 204. The information stored in the memory 202 used in determining whether the first and second devices are included in a portion of a network, such as a VLAN, can include a first table having an entry associating an identifier of the network switch with the identifier of the VLAN. For example, Table 2 includes a text entry "mainName" providing a base name of a switch, and text and integer entries "vlanStr" and "vlanId", respectively, for identifying the VLAN associated with the switch. Neighboring switch information, such as the "intName" entry, can also be included in the table.

TABLE 2

Information describing switch and VLAN associations

| No. | Column | Format | Remark |
|---|---|---|---|
| 1 | mainName | TEXT (NOT NULL) | Base name of a switch |
| 2 | intName | TEXT (NOT NULL) | Name of local neighbor |
| 3 | vlanStr | TEXT (NOT NULL) | OBJECT_VLAN_{vlandId} |
| 4 | vlanId | INTEGER | VLAN ID |

The memory 202 can also include a second table having an entry associating an identifier of the network switch with the second identifier. For example, Table 3 includes a text entry "Name" providing a base name of a switch, and a text entry "Domain" identifying the VLAN broadcast domain associated with the switch.

TABLE 2

Information describing switch and domain associations

| No | Column | Format | Remark |
|---|---|---|---|
| 1 | Name | TEXT (NOT NULL) | Base name of a switch |
| 2 | Domain | TEXT (NOT NULL) | Name or ID of a domain |

According to an exemplary embodiment, the first device can be coupled to other portions of the network by a network router. For example, in FIG. 2, a router 216 is coupled to both VLANs 210, 214 to allow devices included in the VLANs 210, 214 to exchange information across the two VLAN broadcast domains. Recall that because each VLAN broadcast domain is considered a separate subnet, at least one router is still required to exchange information between the VLANs. Typically, the router interface is a member of all of the VLANs between which it routes information.

The instructions of a computer program as illustrated in FIG. 1 for resolving network connectivity can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the concepts and techniques described herein can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for resolving network connectivity, the method comprising:
   determining whether a first device is included in a portion of a network in which the first device can receive information directed to all devices included within the portion of the network;
   obtaining a first identifier associated with the portion of the network;
   assigning a second identifier to the portion of the network based on a domain identifier unique to other portions of the network;
   modifying the first identifier associated with the portion of the network to include the second identifier; and
   associating the modified first identifier with the first device and the portion of the network.

2. The method of claim 1, comprising:
   identifying a second device included in the portion of the network; and
   associating the modified first identifier with the second device.

3. The method of claim 1, comprising:
   presenting a first symbol identifying the first device, connected to a second symbol identifying the portion of the network using the modified first identifier.

4. The method of claim 1, wherein the portion of the network is a broadcast domain.

5. The method of claim 1, wherein the portion of the network is a Virtual Local Area Network (VLAN).

6. The method of claim 5, wherein the first device is a network switch including a Management Information Base (MIB) configured to store an identifier of the VLAN.

7. The method of claim 6, wherein obtaining the first identifier associated with the portion of the network comprises:
   using a Simple Network Management Protocol (SNMP) query to obtain the identifier of the VLAN from the MIB as the first identifier.

8. The method of claim 1, wherein the first device is a port included in a network switch.

9. The method of claim 1, wherein the first device is coupled to other portions of the network by a network router.

10. A system for resolving network connectivity, the system comprising:
    a memory; and
    a processor, including:
    logic configured to determine, using data stored in the memory, whether a first device is included in a portion of a network in which the first device can receive information directed, to all devices included within the portion of the network;
    logic configured to obtain, from the memory, a first identifier associated with the portion of the network;
    logic configured to assign a second identifier to the portion of the network based on a domain identifier unique to other portions of the network;
    logic configured to modify the first identifier associated with the portion of the network to include the second identifier; and
    logic configured to associate the modified first identifier with the first device and the portion of the network.

11. The system of claim 10, wherein the processor comprises:
   logic configured to identify, using the data stored in the memory, a second device included in the portion of the network; and
   logic configured to associate the modified first identifier with the second device.

12. The system of claim 10, comprising:
   a display;
   wherein the processor comprises logic configured to present on the display a first symbol identifying the first device, connected to a second symbol identifying the portion of the network using the modified first identifier.

13. The system of claim 10, wherein the portion of the network is a broadcast domain.

14. The system of claim 10, wherein the portion of the network is a Virtual Local Area Network (VLAN).

15. The system of claim 14, wherein the first device is a network switch including a Management Information Base (MIB) as a portion of the memory, the MIB being configured to store an identifier of the VLAN.

16. The system of claim 15, wherein obtaining the first identifier associated with the portion of the network comprises:
   using a Simple Network Management Protocol (SNMP) query to obtain the identifier of the VLAN from the MIB as the first identifier.

17. The system of claim 15, wherein the data stored in the memory used in determining whether the first device is included in the portion of the network includes a first table having an entry associating an identifier of the network switch with the identifier of the VLAN.

18. The system of claim 15, wherein the memory includes a second table having an entry associating an identifier of the network switch with the second identifier.

19. The system of claim 10, wherein the first device is a port included in a network switch.

20. The system of claim 10, wherein the first device is coupled to other portions of the network by a network router.

21. A non-transitory computer readable storage medium storing therein a computer program for resolving network connectivity, wherein the computer program comprises executable instructions for:
   determining whether a first device is included in a portion of a network in which the first device can receive information directed to all devices included within the portion of the network;
   obtaining a first identifier associated with the portion of the network;
   assigning a second identifier to the portion of the network based on a domain identifier unique to other portions of the network;
   modifying the first identifier associated with the portion of the network to include the second identifier; and
   associating the modified first identifier with the first device and the portion of the network.

22. The computer readable storage medium of claim 21, wherein the computer program comprises executable instructions for:
   identifying a second device included in the portion of the network; and
   associating the modified first identifier with the second device.

23. The computer readable storage medium of claim 21, wherein the computer program comprises executable instructions for:
   presenting a first symbol identifying the first device, connected to a second symbol identifying the portion of the network using the modified first identifier.

24. The computer readable storage medium of claim 21, wherein the portion of the network is a Virtual Local Area Network (VLAN).

25. The computer readable storage medium of claim 24, wherein the first device is a network switch including a Management Information Base (MIB) configured to store an identifier of the VLAN.

26. The computer readable storage medium of claim 25, wherein in obtaining the first identifier associated with the portion of the network, the computer program comprises executable instructions for:
   using a Simple Network Management Protocol (SNMP) query to obtain the identifier of the VLAN from the MIB as the first identifier.

27. A system for resolving network connectivity, the system comprising:
   a processor to:
   determine a first identifier associated with a portion of a network in which a device can receive information directed to all devices included within the portion of the network;
   determine a second identifier associated with the portion of the network based on a domain identifier unique to other portions of the network; and
   associate the first and second identifiers with the device and the portion of the network,
   wherein the processor is to associate the first and second identifiers by modifying the first identifier associated with the portion of the network to include the second identifier.

28. The system of claim 27, wherein the processor is to:
   present an association between the device and the portion of the network based on the first and second identifiers.

29. The system of claim 27, wherein the device comprises:
   storage for the first identifier.

* * * * *

UNITED STATES PATENT AND TRADEMARK OFFICE
CERTIFICATE OF CORRECTION

PATENT NO. : 8,352,637 B2
APPLICATION NO. : 10/667313
DATED : January 8, 2013
INVENTOR(S) : Zhiqiang Wang et al.

Page 1 of 1

It is certified that error appears in the above-identified patent and that said Letters Patent is hereby corrected as shown below:

In the Specifications:

In column 5, line 30, before "identifier" insert -- first --.

In column 6, line 42, after "204" insert -- that is --.

In the Claims:

In Column 8, line 56, in Claim 10, delete "directed," and insert -- directed --, therefor.

Signed and Sealed this
Fourteenth Day of May, 2013

Teresa Stanek Rea
*Acting Director of the United States Patent and Trademark Office*